(12) United States Patent
Martin et al.

(10) Patent No.: US 12,173,660 B1
(45) Date of Patent: Dec. 24, 2024

(54) METHOD AND SYSTEM FOR MITIGATING RING GEAR MISALIGNMENT WITHIN A REDUCTION GEARBOX

(71) Applicant: Pratt & Whitney Canada Corp., Longueuil (CA)

(72) Inventors: Bruno Martin, Saint-Jean sur le Richelieu (CA); Michel Desjardins, Saint-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/400,904

(22) Filed: Dec. 29, 2023

(51) Int. Cl.
*F16H 57/08* (2006.01)
*F02C 7/36* (2006.01)

(52) U.S. Cl.
CPC .............. *F02C 7/36* (2013.01); *F16H 57/08* (2013.01); *F05D 2260/40311* (2013.01)

(58) Field of Classification Search
CPC ...... F16H 1/2818; F16H 1/2863; F16H 57/08; F05D 2260/40311
See application file for complete search history.

(56) References Cited

U.S. PATENT DOCUMENTS

| | | | |
|---|---|---|---|
| 9,617,878 B2 | 4/2017 | Haltiner, Jr. | |
| 2008/0171630 A1* | 7/2008 | Madge | F03D 9/25 475/346 |
| 2016/0327124 A1* | 11/2016 | McCloy | F01L 9/20 |
| 2019/0203806 A1* | 7/2019 | Schulz | F16H 1/2836 |
| 2020/0300340 A1* | 9/2020 | Desjardins | F16H 1/28 |

FOREIGN PATENT DOCUMENTS

DE 4216501 C2 3/2002

* cited by examiner

*Primary Examiner* — Edwin A Young
(74) *Attorney, Agent, or Firm* — Getz Balich LLC

(57) ABSTRACT

A reduction gearbox is provided that includes a sun gear, planet gear assemblies, first and second ring gears, and a ring gear positional alignment system. Each planet gear assembly includes a main gear and first and second lateral gears coupled to one another. The ring gear positional alignment system includes a system controller, a ring gear actuator, and a sensor. The ring gear actuator is engaged with the first ring gear and is configured to rotate the first ring gear relative to the second ring gear. The system controller is in communication with the sensor, the ring gear actuator, and a non-transitory memory storing instructions. The instructions when executed cause the system controller to receive and process signals from the sensor relating to the position of the first ring gear, and control the ring gear actuator to selectively position the first ring gear using the signals from the sensor.

20 Claims, 8 Drawing Sheets

METHOD AND SYSTEM FOR MITIGATING RING GEAR MISALIGNMENT WITHIN A REDUCTION GEARBOX

BACKGROUND OF THE INVENTION

1. Technical Field

The application generally relates to aircraft engines and, more particularly, to gearboxes used in an aircraft engine such as a gas turbine engine.

2. Background Information

Turboprops are gas turbine engines coupled to a propeller via a reduction gearbox. Contrary to a turbofan engine, in which energy from the jet is used to generate thrust, a turboprop turbine converts this energy in mechanical energy. The turbine is then used to drive the propeller. However, the rotational speed of the turbine is too high to be directly coupled to the propeller. Accordingly, a reduction gearbox is used to reduce the rotational speed of the propeller relative to the turbine and to increase the torque generated by the turbine. Gearboxes add weight and complexity to the engine. Improvements are therefore always desirable.

SUMMARY

Some modes for carrying out the present disclosure are presented in terms of the aspects and embodiments detailed herein below. The present disclosure is not limited, however, to the described aspects and embodiments and a person skilled in the art will appreciate that other aspects and embodiments of the present disclosure are possible without deviating from the basic concept of the present disclosure. Headings used herein are for organizational purposes only and are not meant to be used to limit the scope of the description or the enclosed claims. As used throughout this application, the word "may" is used in a permissive sense (i.e., meaning having the potential to), rather than the mandatory sense (i.e., meaning must).

According to an aspect of the present disclosure, a reduction gearbox is provided that includes a sun gear, a plurality of planet gear assemblies, a first ring gear, a second ring gear, and a ring gear positional alignment system. The sun gear has a rotational axis. Each planet gear assembly includes a main gear, a first lateral gear, and a second lateral gear coupled to one another. The main gear of each planet gear assembly is engaged with the sun gear. The first ring gear is engaged with the first lateral gear of each planet gear assembly. The second ring gear is engaged with the second lateral gear of each planet gear assembly. The first and second ring gears are centered on the rotational axis. The ring gear positional alignment system includes a system controller, a ring gear actuator, and a sensor. The ring gear actuator is engaged with the first ring gear and is configured to rotate the first ring gear relative to the second ring gear. The system controller is in communication with the sensor, the ring gear actuator, and a non-transitory memory storing instructions. The instructions when executed cause the system controller to receive and process signals from the sensor relating to the position of the first ring gear, and control the ring gear actuator to selectively position the first ring gear using the signals from the sensor.

In any of the aspects or embodiments described above and herein, the first ring gear may be disposed as an aft ring gear within the reduction gearbox and the second ring gear may be disposed as a forward ring gear within the reduction gearbox.

In any of the aspects or embodiments described above and herein, the second ring gear may be positionally fixed within the reduction gearbox.

In any of the aspects or embodiments described above and herein, the reduction gearbox may include a casing that has a fore casing section and an aft casing section, and the second ring gear may be positionally fixed to the fore casing section.

In any of the aspects or embodiments described above and herein, the first ring gear may be rotatable relative to the aft casing section.

In any of the aspects or embodiments described above and herein, the first ring gear may be rotatable relative to the aft casing section in a first direction and in a second direction, wherein the second direction is opposite the first direction.

In any of the aspects or embodiments described above and herein, the ring gear actuator may include a worm gear drive.

In any of the aspects or embodiments described above and herein, the ring gear actuator may include a linear actuator.

In any of the aspects or embodiments described above and herein, the sensor may be configured to sense the position of the first ring gear relative to the second ring gear.

In any of the aspects or embodiments described above and herein, the sensor may be configured to sense strain within the first ring gear.

According to another aspect of the present disclosure, a method of mitigating ring gear misalignment within a reduction gearbox is provided. The reduction gearbox includes a sun gear, a plurality of planet gear assemblies, and first and second ring gears. The sun gear has a rotational axis. Each planet gear assembly has a main gear and first and second lateral gears. The main gear and the first and second lateral gears are coupled to one another. The main gear of each planet gear assembly is engaged with the sun gear. The first ring gear is engaged with the first lateral gear of each planet gear assembly. The second ring gear is engaged with the second lateral gear of each planet gear assembly. The first and second ring gears are centered on the rotational axis. The method includes using a sensor to determine misalignment between the first and second ring gears, wherein the sensor produces signals representative of the misalignment between the first and second ring gears; and using a ring gear actuator engaged with the first ring gear to rotate the first ring gear relative to the second ring gear an amount that mitigates misalignment between the first ring gear relative to the second ring gear.

In any of the aspects or embodiments described above and herein, the sensor may sense misalignment between the first and second ring gears by sensing a torque output of the reduction gearbox.

In any of the aspects or embodiments described above and herein, the steps of using the sensor and using the ring gear actuator may be performed when the reduction gearbox is under load.

In any of the aspects or embodiments described above and herein, the steps of using the sensor and using the ring gear actuator may be performed iteratively when the reduction gearbox is under load.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
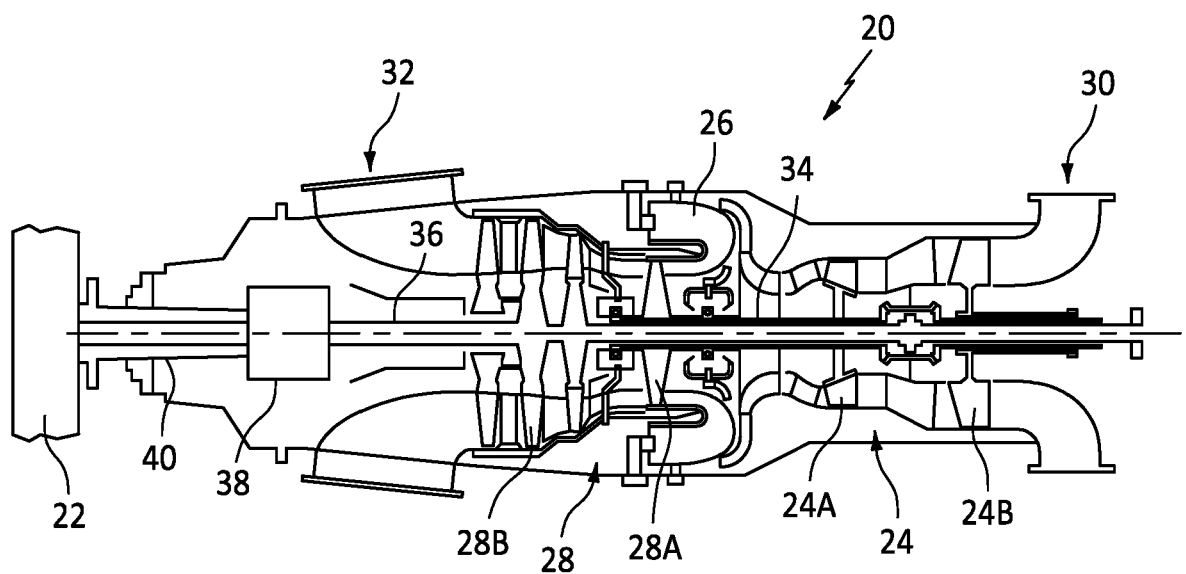
FIG. 1 is a schematic cross-sectional view of a gas turbine engine embodiment.

FIG. 1 illustrates a gas turbine engine 20 configured for driving a load 22, such as, but not limited to, a propeller or a helicopter rotor. Depending on the intended use, the engine 20 may be any suitable aircraft engine, and may be configured as a turboprop engine or a turboshaft engine. The gas turbine engine 20 generally comprises in serial flow communication a compressor section 24, a combustor 26, and a turbine section 28.

The exemplary engine 20 embodiment shown in FIG. 1 is a "reverse-flow" engine because gases flow from the inlet 30, at a rear portion of the engine 20, to the exhaust outlet 32, at a front portion of the engine 20. This is in contrast to "through-flow" gas turbine engines in which gases flow through the core of the engine 20 from a front portion to a rear portion. The engine 20 may be a reverse-flow engine (as illustrated) or a through-flow engine.

In the illustrated embodiment, the turbine section 28 has a high-pressure turbine 28A in communication with a high-pressure compressor 24A via a high-pressure shaft 34, and a low-pressure turbine 28B in communication with a low-pressure compressor 24B via a low-pressure shaft 36. A reduction gearbox 38 is configured to connect the low-pressure shaft 36 to an output shaft 40 that is in driving engagement with a load 22 (e.g., a propeller, a helicopter rotor, or the like) while providing a reduction speed ratio therebetween.

Figure 2:
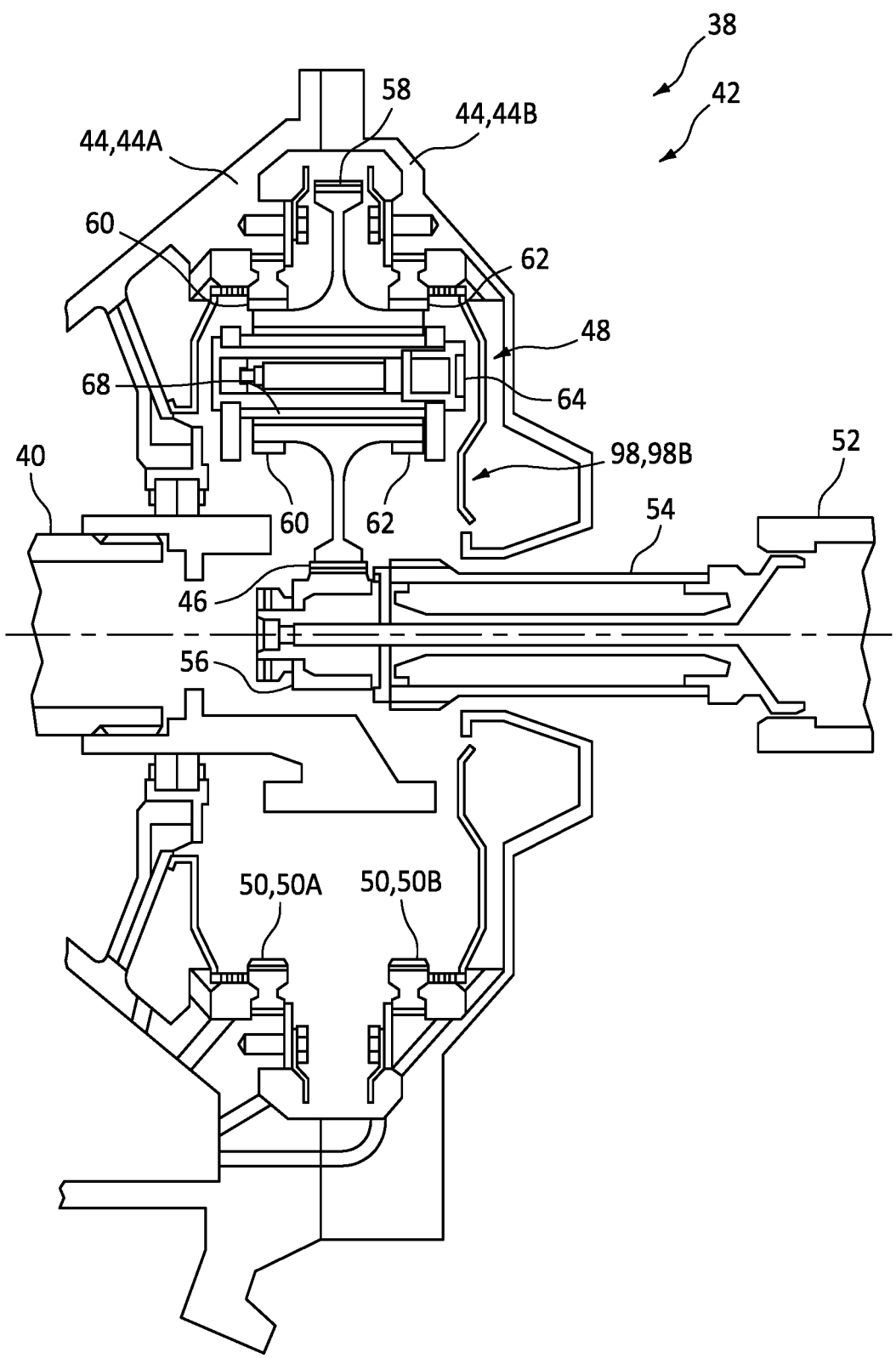
FIG. 2 is a diagrammatic cross-sectional view of a portion of a gas turbine engine like that shown in FIG. 1, illustrating a planetary gear arrangement.

Referring to FIGS. 2-5, the reduction gearbox 38 comprises a planetary gear arrangement 42 disposed within a stationary casing 44 (shown in FIG. 2). The casing 44 may be a multi-piece structure that is assembled to create a unitary casing 44. In the exemplary embodiment shown in FIG. 2, the casing 44 includes a fore casing section 44A and an aft casing section 44B. Mechanical fasteners may be used to attach the fore and aft casing sections 44A, 44B together. The present disclosure is not limited to a casing 44 having a pair of sections 44A, 44B.

The planetary gear arrangement 42 (sometimes referred to as an epicyclic gear train, or an epicyclic gearbox, etc.) includes a sun gear 46, a plurality of planet gear assemblies 48, and a pair of ring gears 50; e.g., a fore ring gear 50A and an aft ring gear 50B. The planetary gear arrangement 42 is in communication with an input shaft 52 and an output shaft 40 (see FIGS. 2 and 5), and the input and output shafts 52, 40 may be disposed on the same rotational axis. The fore and aft ring gears 50A, 50B are independent of one another. The planetary gear arrangement 42 allows the load 22 (see FIG. 1; e.g., a propeller, a rotor blade, or the like) to be driven at a given rotational speed, which is different than the rotational speed of the low-pressure shaft 36. In the embodiment shown, the reduction gearbox 38 is axially mounted at the front end of the engine 20. The casing 44 encloses the planetary gear arrangement 42 and is configured to accept an input shaft 52 and an output shaft 40 or components respectively in communication therewith. The input shaft 52 may be the low-pressure shaft 36 or may be an intermediary structure (e.g., an intermediary structure that includes a layshaft 54) in communication with the low-pressure shaft 36. The output shaft 40 may be a structure that is directly connected to the load 22 or may be an intermediary structure that is in communication with the load 22. The present disclosure is not limited to any particular output shaft 40 or input shaft 52 configuration. In those embodiments that include a layshaft 54, the layshaft 54 may be preassembled with the low-pressure shaft 36.

Figure 3:
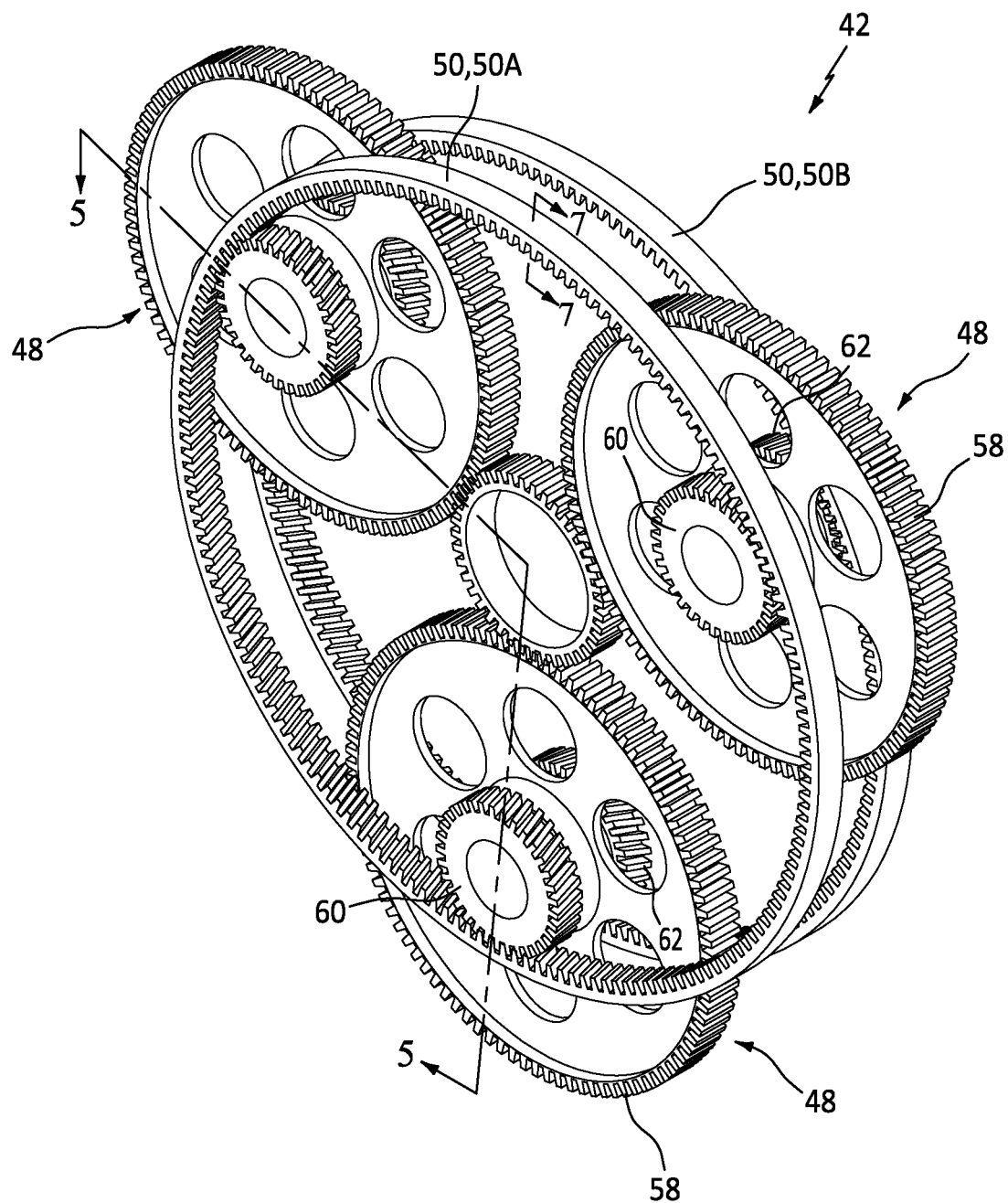
FIG. 3 is a diagrammatic perspective view of a planetary gear arrangement embodiment having three planet gear assemblies.
Figure 4:
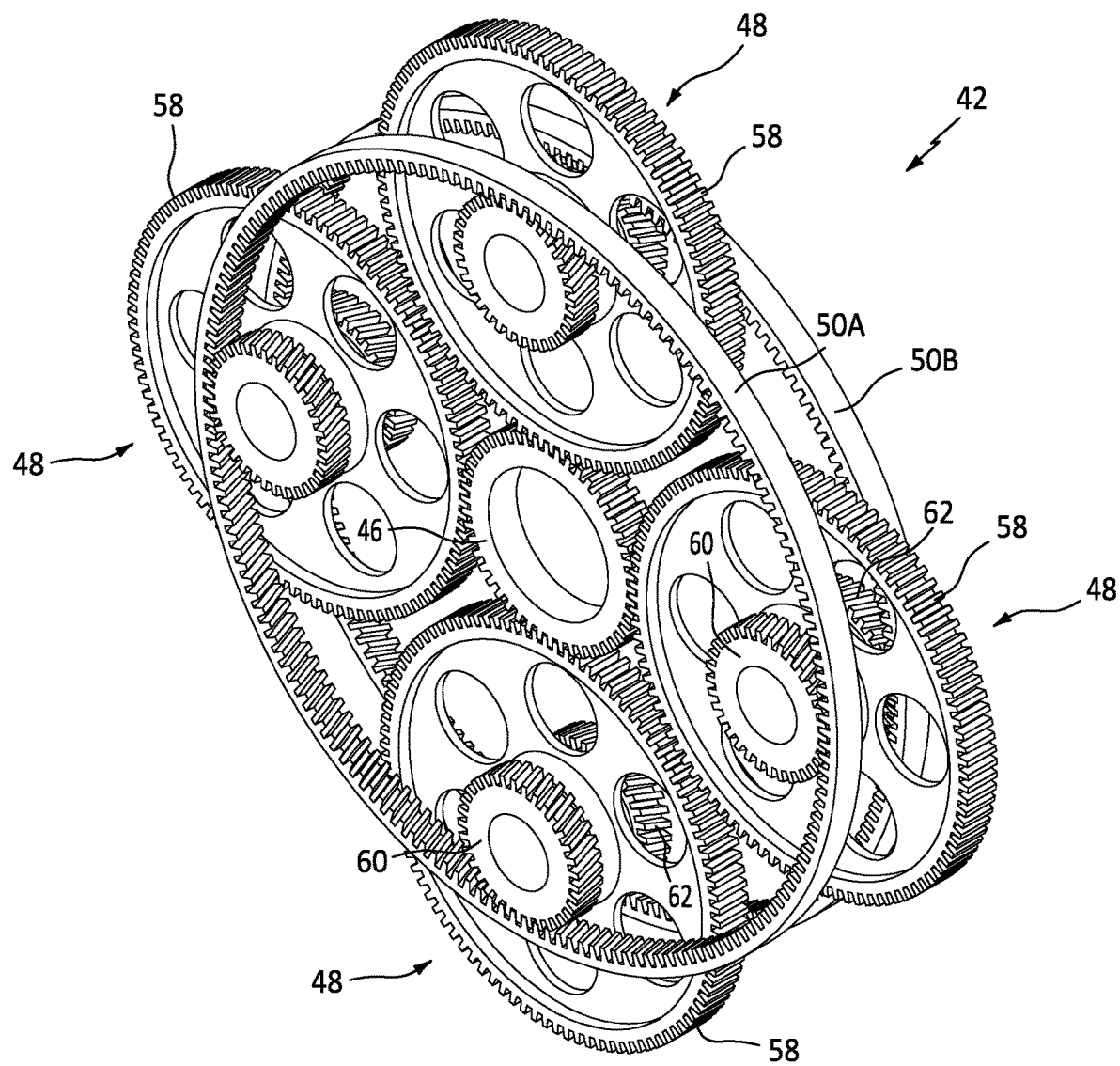
FIG. 4 is a diagrammatic perspective view of a planetary gear arrangement embodiment having four planet gear assemblies.
Figure 5:
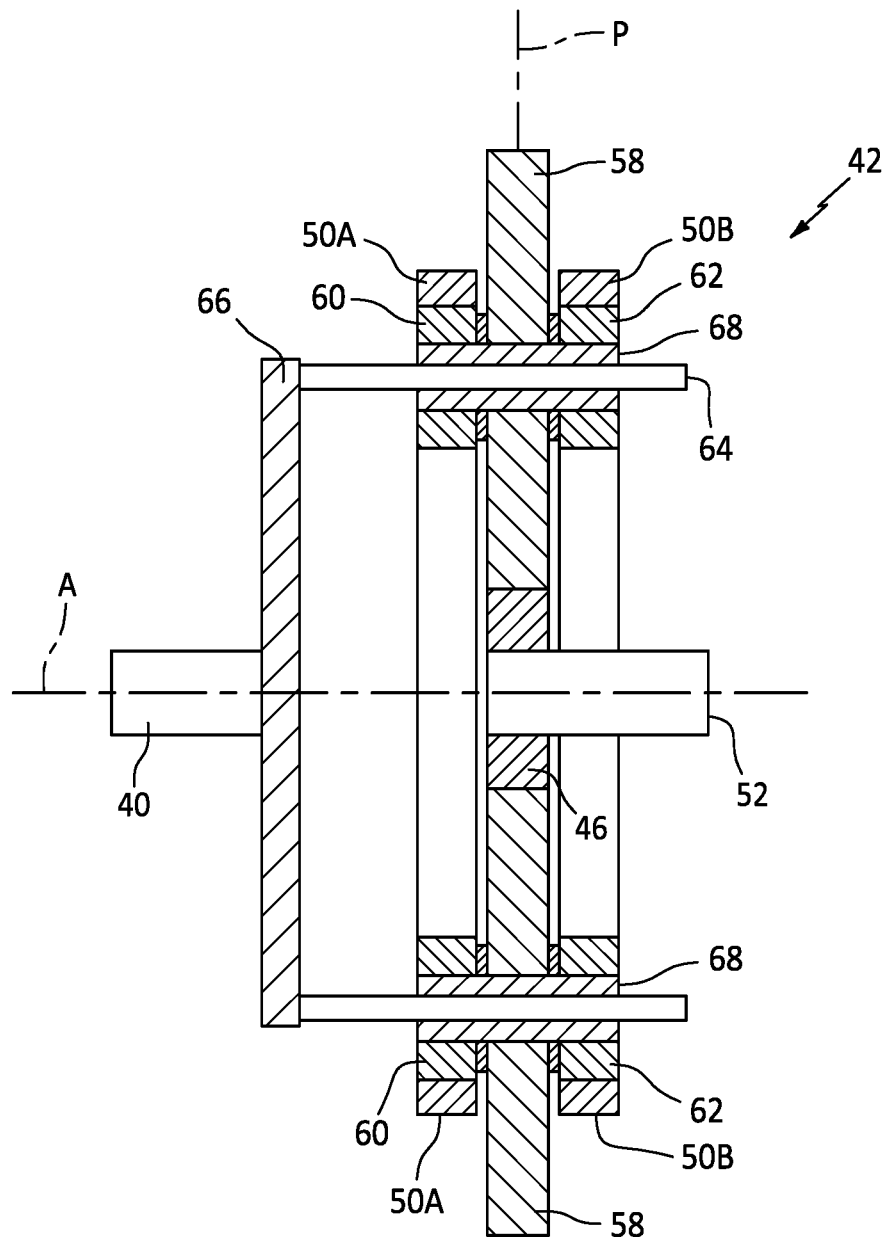
FIG. 5 is a diagrammatic sectional view along line 5-5 of the planetary gear arrangement shown in FIG. 3.

The planetary gear arrangement 42 diagrammatically illustrated in FIGS. 2, 3, and 5 and described herein includes three planet gear assemblies 48. Present disclosure planetary gear arrangement 42 embodiments may alternatively include fewer than three planet gear assemblies 48 or more than three planet gear assemblies 48; e.g., FIG. 4 includes four planet gear assemblies 48. To facilitate the description herein, the present disclosure will be described in terms of three planet gear assemblies 48.

The sun gear 46 has a pitch diameter ($P_{DSG}$) and is configured with teeth disposed circumferentially around its outer diameter. In some embodiments, the sun gear teeth may be configured as a spur gear. The sun gear 46 is in driving communication with the input shaft 52. For example, the sun gear 46 may be in communication with a sun gear connector 56, and the sun gear connector 56 may be connected with a layshaft 54 that is in communication with the low-pressure shaft 36. The layshaft 54 may be in splined communication with the low-pressure shaft 36. The present disclosure is not limited to any particular arrangement for providing driving communication between the sun gear 46 and the low-pressure shaft 36.

Figure 6:
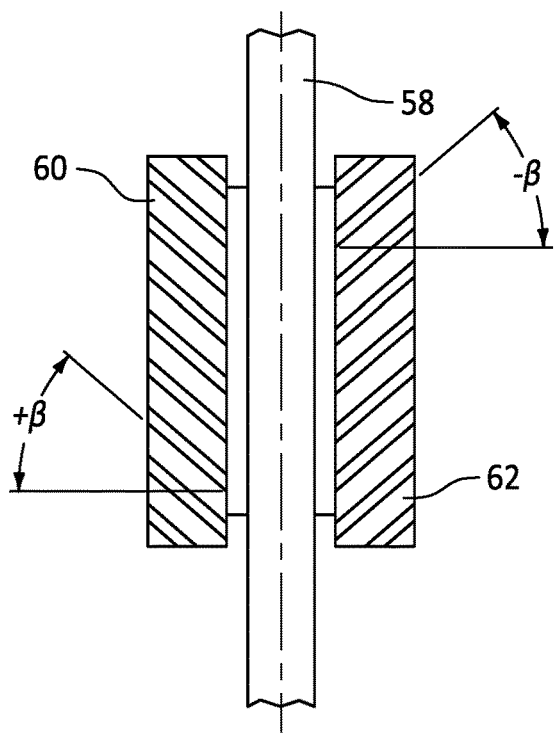
FIG. 6 is a diagrammatic sectional view of a planet gear assembly.

Each planet gear assembly 48 includes a main gear 58, a fore lateral gear 60, and an aft lateral gear 62. Each planet gear assembly 48 is rotatably mounted on a shaft 64 (see FIGS. 2 and 5). The fore and aft lateral gears 60, 62 are disposed on opposite sides of the main gear 58 and are attached to the main gear 58 such that the fore and aft lateral gears 60, 62 and the main gear 58 share a rotational axis and are driven together. The main gear 58 has a pitch diameter ($P_{DMG}$) and the fore and aft lateral gears 60, 62 each have a pitch diameter ($P_{DLG}$). In some embodiments, the fore and aft lateral gears 60, 62 and the main gear 58 may be a monolithic structure. In some embodiments, the fore and aft lateral gears 60, 62 may be independent elements that are attached to the main gear 58 to form a unitary structure. The main gear 58 of each planet gear assembly 48 is configured to mesh with the sun gear 46. In some embodiments, the main gear 58 may be configured as a spur gear configured to mesh with a sun gear 46 configured as a spur gear. In some embodiments, the fore lateral gear 60 of each respective planet gear assembly 48 may be configured as a helical gear configured to mesh with a respective fore ring gear 50A configured as a helical gear, and the aft lateral gear 62 of each respective planet gear assembly 48 may be configured as a helical gear configured to mesh with a respective aft ring gear 50B configured as a helical gear. In those embodiments wherein the fore and aft lateral gears 60, 62 are configured as helical gears, the teeth of the respective fore lateral gears 60 may be angled in a first orientation and the teeth of the respective aft lateral gears 62 may be angled in a second orientation, oppositely mirroring the first orientation. FIG. 6 illustrates the teeth of a fore lateral gear 60 disposed in a first orientation with the teeth disposed at an angle +β relative to the rotational axis of the planet gear assembly 48, and the teeth of an aft lateral gear 62 disposed in a second orientation with the teeth disposed at an angle −β relative to the rotational axis of the planet gear assembly 48. In an alternative embodiment, the fore lateral gear 60 of each respective planet gear assembly 48 may be configured as a spur gear configured to mesh with a respective fore ring gear 50A configured as a spur gear, and the aft lateral gear 62 of each respective planet gear assembly 48 may be configured as a spur gear configured to mesh with a respective aft ring gear 50B configured as a spur gear.

In some embodiments (e.g., like that diagrammatically shown in FIG. 5), the shaft 64 of each planet gear assembly 48 may be connected to a planet carrier 66. In these embodiments, the planet gear assemblies 48 may be described as being mounted with the planet carrier 66. In some embodiments, the shaft 64 of at least one planet gear assembly 48 may not be connected to a planet carrier 66 and that planet gear assembly 48 is not mounted with the planet carrier 66. Each planet gear assembly 48 rotates relative to its respective shaft 64. A bearing 68 may be disposed between the shaft 64 and the respective planet gear assembly 48. The planet carrier 66 is configured to connect the planetary gear arrangement 42 to an output shaft 40 which is in turn connected to the load 22. The planet carrier 66 may be in direct communication with the output shaft 40 or maybe in indirect communication with an output shaft 40 via a connector. The present disclosure is not limited to any particular arrangement for connecting the planet carrier 66 with the output shaft 40 and not limited to any particular planet carrier 66 configuration.

Figure 7:
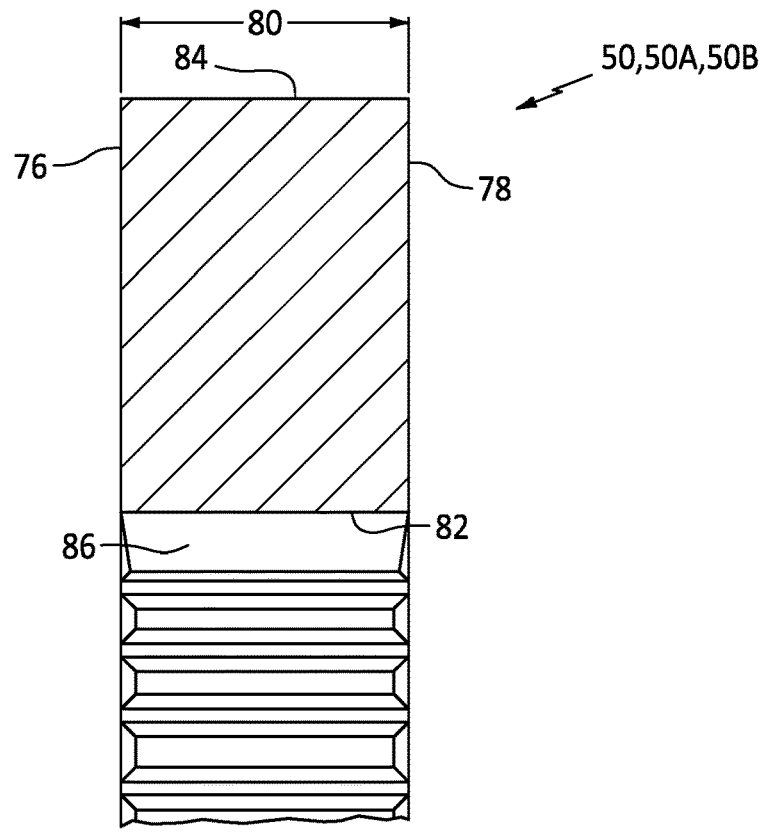
FIG. 7 is a diagrammatic cross-sectional view of a ring gear embodiment.

FIG. 7 is a diagrammatic sectional view (see Section 7-7 in FIG. 3) of a ring gear 50. As shown in FIG. 7, each ring gear 50 has a body that includes a first lateral side surface 76, a second lateral side surface 78, a width 80, an inner radial surface 82, an outer radial surface 84, and a plurality of teeth 86. The width 80 extends between the lateral side surfaces 76, 78. The teeth 86 that mesh with the fore and aft lateral gears 60, 62 extend radially inwardly from the inner radial surface 82 and may be described as having a pitch diameter ($P_{DRGFT}$). The present disclosure is not limited to any particular ring gear 50 configuration.

Referring to FIG. 2, the fore ring gear 50A is rotationally fixed. A mechanical engagement between the fore ring gear 50A and the fore casing section 44A may be used to fix the respective ring gear 50A; e.g., a mechanical engagement that includes a male and female structure such as mating teeth, a key and keyway arrangement, a flange and fastener arrangement, one or more studs and stud holes, or the like.

As will be described herein, the aft ring gear 50B is rotationally fixed but for a small amount of rotation that is permitted for alignment purposes. The planet gear assemblies 48 rotate relative to the ring gears 50A, 50B.

The sun gear 46, planet gear assemblies 48, and the ring gears 50A, 50B are arranged in a planetary or epicyclic arrangement. The sun gear 46 is disposed centrally with the planet gear assemblies 48 disposed radially outside of the sun gear 46. The main gear 58 of each planet gear assembly 48 is aligned with the sun gear 46 and meshes with the sun gear 46. The fore ring gear 50A is aligned with and meshes with the fore lateral gears 60 of the planet gear assemblies 48. The aft ring gear 50B is aligned with and meshes with the aft lateral gears 62 of the planet gear assemblies 48. Hence, the ring gears 50A, 50B are disposed symmetrically on each side of the main gears 58 so that the reaction load on the bearings 68 is equalized along the rotational axis of the respective planet gear assembly 48. By having two ring gears 50A, 50B disposed on opposite sides of the main gears 58, the load is symmetrically distributed relative to a plane P shown in FIG. 5, to which an axis of rotation A of the sun gear 46 is normal. Plane P is located halfway through a thickness of the main gears 58. In those embodiments wherein the lateral gears 60, 62 are helical gears with opposite orientations, during operation of the planetary gear arrangement 42, the lateral gears 60, 62 facilitate self-centering of the main gears 58 of the planet gear assemblies 48 under torque relative to the sun gear 46. This may enhance the load sharing between the ring gears 50A, 50B.

The pitch diameter ($P_{DSG}$) of the sun gear 46 is inferior to the pitch diameter ($P_{DMG}$) of the main gear 58 of each planet gear assembly 48. The pitch diameter of the lateral gears 60, 62 ($P_{DLG}$) of a respective planet gear assembly 48 is inferior to the pitch diameter ($P_{DMG}$) of the main gear 58 of that planet gear assembly 48. The pitch diameter of the lateral gears 60, 62 ($P_{DLG}$) in each planet gear assembly 48 is inferior to the pitch diameter ($P_{DRGFT}$) of the ring gear teeth 86 of each ring gear 50A, 50B. As stated above, the present disclosure planetary gear arrangement 42 allows a load 22 (e.g., a propeller, a rotor blade, or the like) to be driven at a given rotational speed that is different from the rotational speed of the low-pressure shaft 36. More specifically, the respective pitch diameters of the planet gear assembly 48 components can be chosen for a given application that permits the gas turbine engine 20 to operate (i.e., low-pressure shaft 36 rotational speed) in a predetermined range that is optimal for the engine 20, and that permits the load 22 (e.g., propeller, rotor blade, and the like) to be driven in a predetermined speed range that is optimal for the load 22. In this manner, the planetary gear arrangement 42 can be configured to enable a propeller to be driven in a quieter mode.

Proper assembly of the reduction gearbox 38, including the individual components of the planetary gear arrangement 42, is important to ensure proper reduction gearbox 38 component positioning and consequent proper gear meshing. Accurate alignment is important to mitigate gear tooth wear and/or bearing stress that may occur due to misalignment. Accurate alignment may also improve the efficiency of a reduction gearbox 38, and that gain in efficiency may improve the specific fuel consumption (SFC) of the engine 20. Techniques for assembling a reduction gearbox are known. U.S. patent application Ser. No. 18/195,334, entitled "Method and System for Assembling a Reduction Gearbox", filed May 9, 2023, and commonly assigned with the present application describes a method and system for assembling a reduction gearbox that is particularly useful. U.S. patent application Ser. No. 18/195,334 is hereby incorporated by reference in its entirety. The present disclosure is not limited to any particular method and/or system for assembling a reduction gearbox.

The numerous reduction gearbox components (e.g., casing sections 44A, 44B, ring gears 50A, 50B, planet gear assemblies 48, sun gear 46, and so on) are all manufactured within dimensional tolerance ranges. When the reduction gearbox is assembled, the tolerances for various components may accumulate. The accumulated tolerances may collectively be within an acceptable tolerance range (which range may be a function of manufacturing method capacity, or cost considerations, etc.), but the accumulated tolerances may be closer to an end of the acceptable tolerance range. As a result, component positional deviation (e.g., attributable to manufacturing or operational deviations attributable to thermal expansion, deflection, or the like) may cause assembled components to be out of position.

Figure 8:
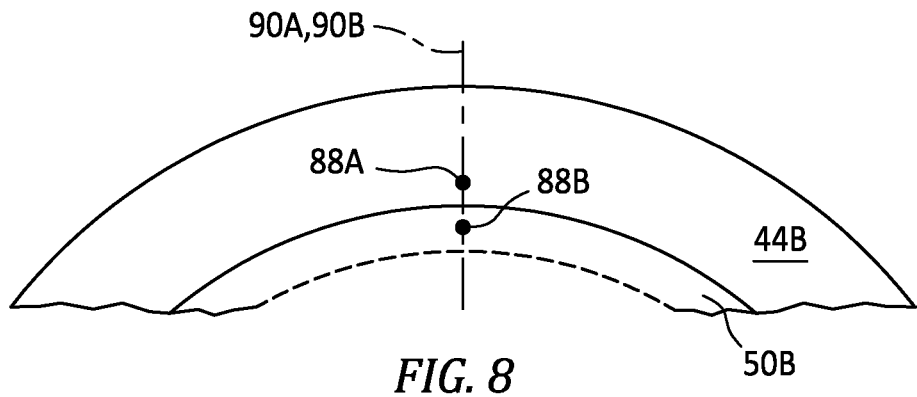
FIGS. 8-8B diagrammatically illustrate ring gear alignment positions.
Figure 8A:
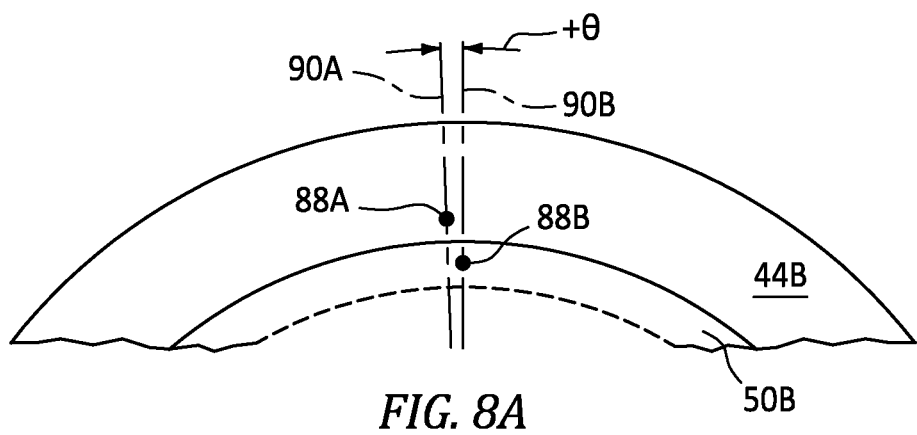
Figure 8B:
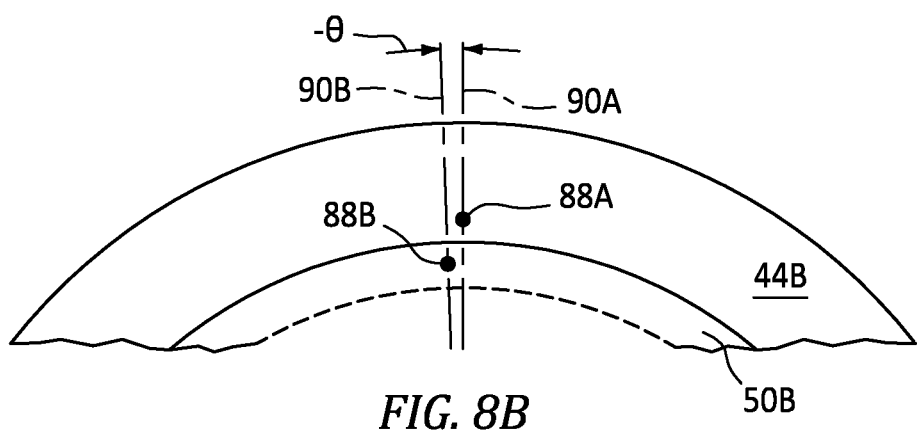

Alignment of the ring gears 50A, 50B is particularly important. At the time of assembly, ring gear 50A, 50B alignment may be acceptable (i.e., at a predetermined alignment position), or it may deviate from a predetermined alignment position. The deviation from the predetermined alignment position may be such that the alignment of the ring gears 50A, 50B is still within an acceptable range, but represents a deviation from the predetermined alignment position. As stated above, during operation of a reduction gearbox component alignment may deviate as a function of the reduction gearbox operating conditions; e.g., operating temperature, the load 22 applied to the reduction gearbox, and the like. Furthermore, during operation of a reduction gearbox component alignment may deviate over time as operating conditions change; e.g., during operation the operating temperature of the reduction gearbox may vary, or the load 22 applied to the reduction gearbox may vary, or the like or any combination thereof. A deviation from the predetermined alignment position that may occur during operation of the reduction gearbox may be such that the alignment of the ring gears 50A, 50B is still within an acceptable range (but still a deviation from the predetermined alignment position) or a deviation from the predetermined alignment position that occurs during operation may be such that the alignment of the ring gears 50A, 50B is outside of an acceptable alignment range. FIGS. 8-8B diagrammatically illustrate ring gear 50 alignment positions. To facilitate the description herein, ring gear 50 alignment is depicted in terms of reference markers 88A, 88B disposed on the aft casing section 44B and the aft ring gear 50B. The present disclosure is not limited to determining alignment using reference markers 88A, 88B on the aft casing section 44B and the aft ring gear 50B; e.g., alignment may be determined by the relative positions of the fore ring gear 50A and the aft ring gear 50B. FIG. 8 diagrammatically illustrates the aft ring gear 50B aligned with a predetermined alignment position depicted by lines 90A, 90B extending through a first reference marker 88A disposed on the aft casing section 44B and through a second reference marker 88B disposed on the aft ring gear. FIG. 8A diagrammatically illustrates the aft ring gear 50B misaligned with the predetermined alignment position; e.g., the aft ring gear 50B is rotated a small number of degrees in a clockwise direction-angle "+0". The diagrammatic representation of misalignment is depicted by a first line 90A extending through a first reference marker 88A disposed on the aft casing section 44B and a second line 90B through a second reference marker 88B disposed on the aft ring gear 50B. The first and second lines 90A, 90B extend from the rotational axis of the aft ring gear 50B; e.g., the axis of rotation "A" shown in FIG. 4. FIG. 8B diagrammatically illustrates the aft ring gear 50B misaligned with the predetermined alignment position; e.g., the aft ring gear 50B is rotated a small number of degrees in a counterclockwise direction. The diagrammatic representation of misalignment is depicted by a first line 90A extending through a first reference marker 88A disposed on the aft casing section 44B and a second line 90B through a second reference marker 88B disposed on the aft ring gear 50B. The first and second lines 90A, 90B extend from the rotational axis of the aft ring gear 50B; e.g., the axis of rotation "A" shown in FIG. 4 and are separated by the angle "−0". The amount of misalignment shown in FIGS. 8A and 8B is purposefully exaggerated to facilitate the explanation.

Figure 9:
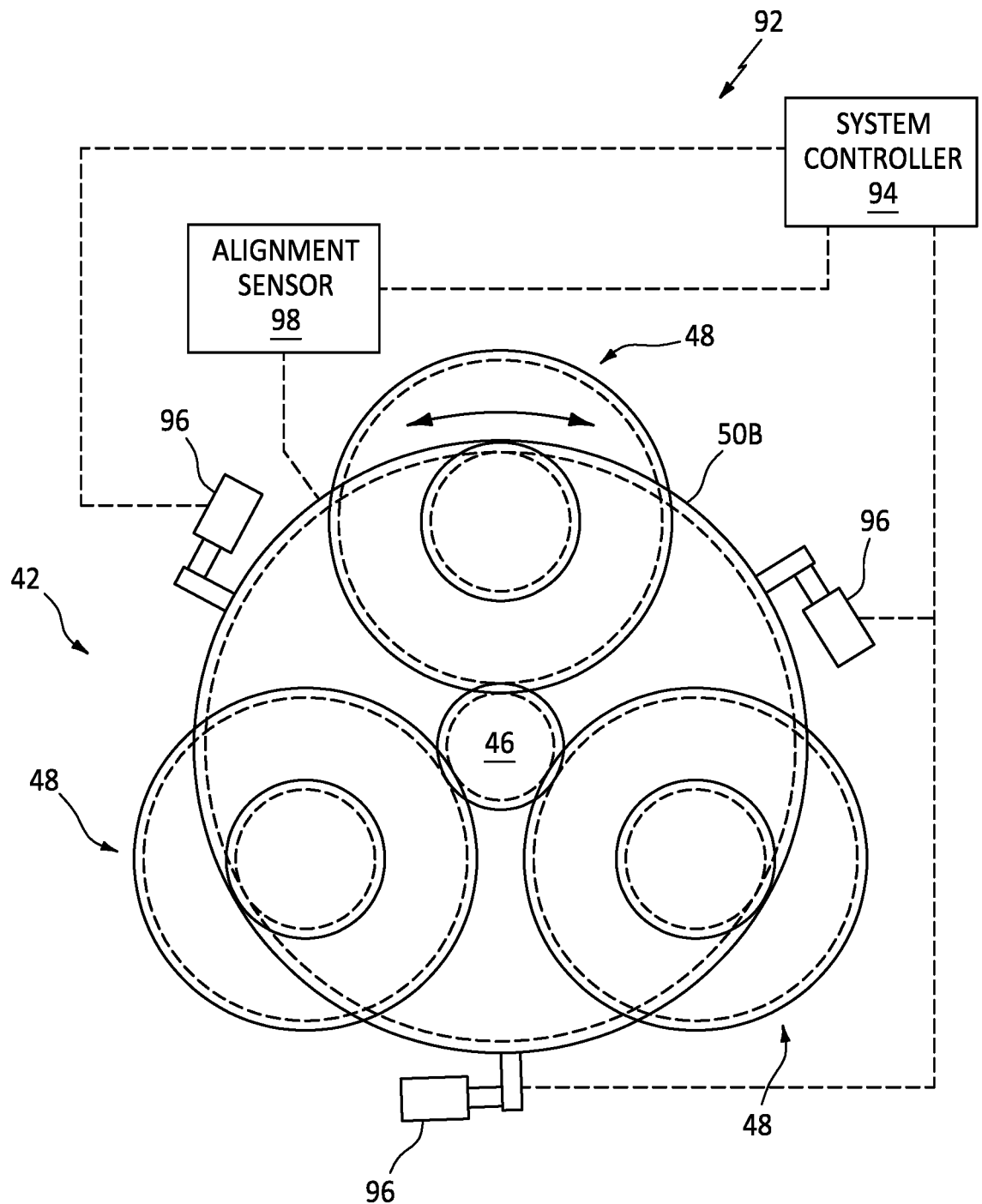
FIG. 9 is a diagrammatic representation of a present disclosure ring gear positional adjustment (RGPA) system embodiment.

Referring to FIG. 9, the present disclosure provides a ring gear positional adjustment (RGPA) system and method (hereinafter referred to as the "RGPA system 92", which is intended to refer to the method as well) that is configured to identify the alignment of a ring gear 50A, 50B (or a deviation from a predetermined alignment position) and configured to adjust the alignment of the ring gear 50A, 50B from a first alignment position to a second alignment position, wherein the first alignment position is a deviation from a predetermined alignment position and the second alignment position is an improved alignment position relative to the first alignment position. To facilitate the description herein, the ring gear 50 that is to be sensed and potentially positionally adjusted will be described in terms of the aft ring gear 50B. The present disclosure is not limited to sensing and positionally adjusting the aft ring gear 50B; e.g., the present disclosure RGPA system 92 may be configured to sense and positionally adjust the fore ring gear 50A rather than the aft ring gear 50B, or the RGPA system 92 may be configured to sense and positionally adjust both the fore ring gear 50A and the aft ring gear 50B.

The RGPA system 92 includes a system controller 94, one or more ring gear actuators 96, and one or more sensors 98 configured to identify the alignment of a ring gear 50.

The system controller 94 is in communication with system components such as the ring gear actuators 96 and the sensors 98. The system controller 94 may be in communication with these components to control and/or receive signals therefrom to perform the functions described herein. The system controller 94 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 92 to accomplish the same algorithmically and/or coordination of system components. The system controller 94 includes or is in communication with one or more memory devices. The present disclosure is not limited to any particular type of memory device, and the memory device may store instructions and/or data in a non-transitory manner. Examples of memory devices that may be used include a computer readable storage medium, a read-only memory, random access memory, volatile memory, non-volatile memory, static memory, dynamic memory, flash memory, cache memory, and/or any device that stores digital information. Communications between the system controller 94 and other system components may be via a hardwire connection or via a wireless connection. The system controller 94 is described herein as a dedicated system component. The present disclosure is not limited to a dedicated system controller 94.

For example, the functionality described herein as being performed by the system controller 94 could be performed by a controller that performs other functionality beyond the RGPA system 92 (i.e., a non-dedicated controller), or the aforesaid functionality could be collectively performed by more than one controller. The present disclosure is not limited to any particular controller configuration or hierarchy.

A ring gear actuator 96 may be any device that is configured to rotate the aft ring gear 50B about its rotational axis; e.g., see the axis of rotation "A" in FIG. 4. The ring gear actuator 96 may be controlled by the system controller 94 to rotate the aft ring gear 50B in either rotational direction; e.g., based on the input from the sensors 98. An example of an acceptable ring gear actuator 96 is a worm gear drive. In this embodiment, a portion of the aft ring gear 50B (e.g., the first lateral side surface 76, the second lateral side surface 78, or the outer radial surface 84—see FIG. 7) may be configured for engagement with the worm gear drive. The actuation of the worm gear drive can be related to an amount (e.g., degrees) of aft ring gear 50B rotation. Hence, the system controller 94 can be used to control the worm gear drive to achieve a desired amount of ring gear rotation (i.e., positional deviation). Another example of an acceptable ring gear actuator 96 is a linear actuator device such as a hydraulic cylinder, or a pneumatic cylinder, or an electric linear actuator, or the like. The actuator 96 stroke can be related to an amount (e.g., degrees) of aft ring gear 50B rotation. The present disclosure is not limited to any particular type of ring gear actuator 96. The RGPA system 92 diagrammatically shown in FIG. 9 includes three ring gear actuators 96. The present disclosure is not limited to any particular number of ring gear actuators 96 other than at least one ring gear actuator 96.

The RGPA system 92 may be configured to utilize a variety of different sensors 98 for identifying the alignment (including a positional deviation as applicable) of the aft ring gear 50B. An example of a sensor 98 that may be used is one that is configured to sense the relative positions of the fore ring gear 50A and the aft ring gear 50B, and relative movement therebetween, or the position of the aft ring gear 50B relative to a reference point; e.g., a reference point disposed on the aft casing section 44B, or other component. A linear variable differential transformer (LVDT) is a specific type of sensor 98 that may be used to sense the relative positions of the fore ring gear 50A and the aft ring gear 50B, or the aft ring gear 50B relative to a reference point. Another example of a sensor 98 that may be used is a sensor 98 configured to sense mechanical strain in the aft gear ring 50B. Misalignment of the aft gear ring 50B will likely produce strain within the aft gear ring 50B that can be sensed. Another example of a sensor 98 that may be used is a sensor 98 that senses the torque produced by the reduction gearbox 38 as a function of the position of the aft ring gear 50B. A misaligned aft ring gear 50B may impede the meshing of gears within the reduction gearbox 38 and thereby affect the efficiency of torque produced by the reduction gearbox 38. The present disclosure is not limited to these sensor 98 examples. In each of these examples, instructions stored within the system controller 94 may be used to correlate signals received from the sensor 98 (e.g., signals representative of positional deviation, strain, torque, etc.) relative to a reference value (e.g., a predetermined alignment position, or strain value, etc.) and produce signals to the ring gear actuator 96, controlling the ring gear actuator 96 to adjust the alignment of the aft ring gear 50B (i.e., rotate the aft ring gear 50B) from a then current alignment position (i.e., a first alignment position) to an adjusted alignment position (i.e., a second alignment position), wherein the current alignment position is a deviation from a predetermined alignment position. The present disclosure is not limited to any particular adjustment methodology. For example, the positional adjustment methodology of the aft gear ring 50B position may be a step function wherein an adjustment is made, and the alignment of the aft gear ring 50B is subsequently reevaluated, or alternatively the positional adjustment methodology of the aft gear ring position 50B may be from the then current alignment position to a predetermined alignment position and the alignment of the aft gear ring 50B may subsequently be reevaluated. In these examples, the adjustment may be described as an iterative process. In some embodiments of the present disclosure RGPA system 92, the sensing and potential ring gear positional adjustment may be performed upon the occurrence of certain events (e.g., at engine start-up, or at certain throttle positions during use, or at certain load 22 conditions during use), or it may be performed periodically (e.g., at set time intervals during operation), or any combination thereof. The present disclosure is not limited to any particular ring gear 50 positional adjustment methodology.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A reduction gearbox, comprising:
a sun gear having a rotational axis;
a plurality of planet gear assemblies, each planet gear assembly of the plurality of planet gear assemblies has a main gear, a first lateral gear, and a second lateral gear coupled to one another;
wherein the main gear of each said planet gear assembly is engaged with the sun gear;
a first ring gear is engaged with the first lateral gear of each said planet gear assembly;
a second ring gear is engaged with the second lateral gear of each said planet gear assembly;
wherein the first ring gear and the second ring gear are centered on the rotational axis; and
a ring gear positional alignment system having a system controller, a ring gear actuator, and a sensor, wherein the ring gear actuator is engaged with the first ring gear and is configured to rotate the first ring gear relative to the second ring gear, wherein the system controller is in communication with the sensor, the ring gear actuator, and a non-transitory memory storing instructions, which instructions when executed cause the system controller to:
receive and process signals from the sensor relating to a position of the first ring gear; and
control the ring gear actuator to selectively position the first ring gear using the signals from the sensor.

2. The reduction gearbox of claim 1, wherein the first ring gear is disposed as an aft ring gear within the reduction gearbox and the second ring gear is disposed as a forward ring gear within the reduction gearbox.

3. The reduction gearbox of claim 2, wherein the second ring gear is positionally fixed within the reduction gearbox.

4. The reduction gearbox of claim 3, wherein the reduction gearbox includes a casing having a fore casing section and an aft casing section, and the second ring gear is positionally fixed to the fore casing section.

5. The reduction gearbox of claim 4, wherein the first ring gear is rotatable relative to the aft casing section.

6. The reduction gearbox of claim 5, wherein the first ring gear is rotatable relative to the aft casing section in a first direction and in a second direction, wherein the second direction is opposite the first direction.

7. The reduction gearbox of claim 1, wherein the ring gear actuator includes a worm gear drive.

8. The reduction gearbox of claim 1, wherein the ring gear actuator includes a linear actuator.

9. The reduction gearbox of claim 1, wherein the sensor is configured to sense the position of the first ring gear relative to the second ring gear.

10. The reduction gearbox of claim 1, wherein the sensor is configured to sense strain within the first ring gear.

11. A method of mitigating ring gear misalignment within a reduction gearbox, the reduction gearbox including a sun gear having a rotational axis, a plurality of planet gear assemblies, each planet gear assembly a main gear, a first lateral gear, and a second lateral gear, wherein the main gear, the first lateral gear, and the second lateral gear are coupled to one another, and wherein the main gear of each said planet gear assembly is engaged with the sun gear, and a first ring gear is engaged with the first lateral gear of each said planet gear assembly, and a second ring gear is engaged with the second lateral gear of each said planet gear assembly, and wherein the first ring gear and the second ring gear are centered on the rotational axis, the method comprising:
using a sensor to determine misalignment between the first ring gear and the second ring gear, the sensor producing signals representative of the misalignment between the first ring gear and the second ring gear; and
using a ring gear actuator engaged with the first ring gear to rotate the first ring gear relative to the second ring gear an amount that mitigates misalignment between the first ring gear relative to the second ring gear.

12. The method of claim 11, wherein the first ring gear is disposed as an aft ring gear within the reduction gearbox and the second ring gear is disposed as a forward ring gear within the reduction gearbox.

13. The method of claim 12, wherein the reduction gearbox includes a casing having a fore casing section and an aft casing section, and the second ring gear is positionally fixed to the fore casing section.

14. The method of claim 13, wherein the first ring gear is rotatable relative to the aft casing section in a first direction and in a second direction, wherein the second direction is opposite the first direction.

15. The method of claim 11, wherein the ring gear actuator includes a worm gear drive.

16. The method of claim 11, wherein the ring gear actuator includes a linear actuator.

17. The method of claim 11, wherein the sensor senses misalignment between the first ring gear and the second ring gear by sensing strain within the first ring gear.

18. The method of claim 11, wherein the sensor senses misalignment between the first ring gear and the second ring gear by sensing a torque output of the reduction gearbox.

19. The method of claim 11, wherein the steps of using the sensor and using the ring gear actuator are performed when the reduction gearbox is under load.

20. The method of claim 19, wherein the steps of using the sensor and using the ring gear actuator are performed iteratively when the reduction gearbox is under load.

* * * * *